United States Patent

Samsel

[15] 3,640,073

[45] Feb. 8, 1972

[54] BARRIER FOR DEFINING A SWIMMING AREA

[72] Inventor: Frank J. Samsel, 13455 Lake Ave., Lakewood, Ohio 44107

[22] Filed: May 7, 1969

[21] Appl. No.: 822,400

[52] U.S. Cl. ................................. 61/1 F, 4/172, 4/172.19
[51] Int. Cl. ............... E02b 3/00, E02b 15/00, E02b 15/04
[58] Field of Search .................. 61/1, 5; 114/.5 F, 43.5; 4/172–172.19, 172.21, 171

[56] References Cited

UNITED STATES PATENTS

| 2,057,358 | 10/1936 | Baker | 4/171 |
| 3,078,472 | 2/1963 | Salisbury | 4/171 |
| 2,240,567 | 5/1941 | Mencham et al. | 61/1 F |
| 2,749,956 | 6/1956 | Eldred | 4/172 |
| 3,321,923 | 5/1967 | Smith et al. | 61/1 F |
| 3,357,192 | 12/1967 | Hibarger | 61/5 |
| 3,476,246 | 11/1969 | Dahan | 61/1 F |

Primary Examiner—Peter M. Caun
Attorney—Adrian Medert

[57] ABSTRACT

This invention relates to a floatable barrier comprising a plurality of sections or panel members, removably secured together to form an integrated structure for use in isolating or defining a confined area along the edge of a body of water, which area can be treated and made safe for human occupancy. Each section or panel member is formed of a flexible sheet of impervious material with the upper edge portion thereof overlapped to define a chamber coextensive with the width of the section for receiving floatable material which may be either a solid or a gas and the lower edge portion reinforced and secured to anchoring means, for maintaining the sections in a substantially vertical position when disposed within the water.

6 Claims, 9 Drawing Figures

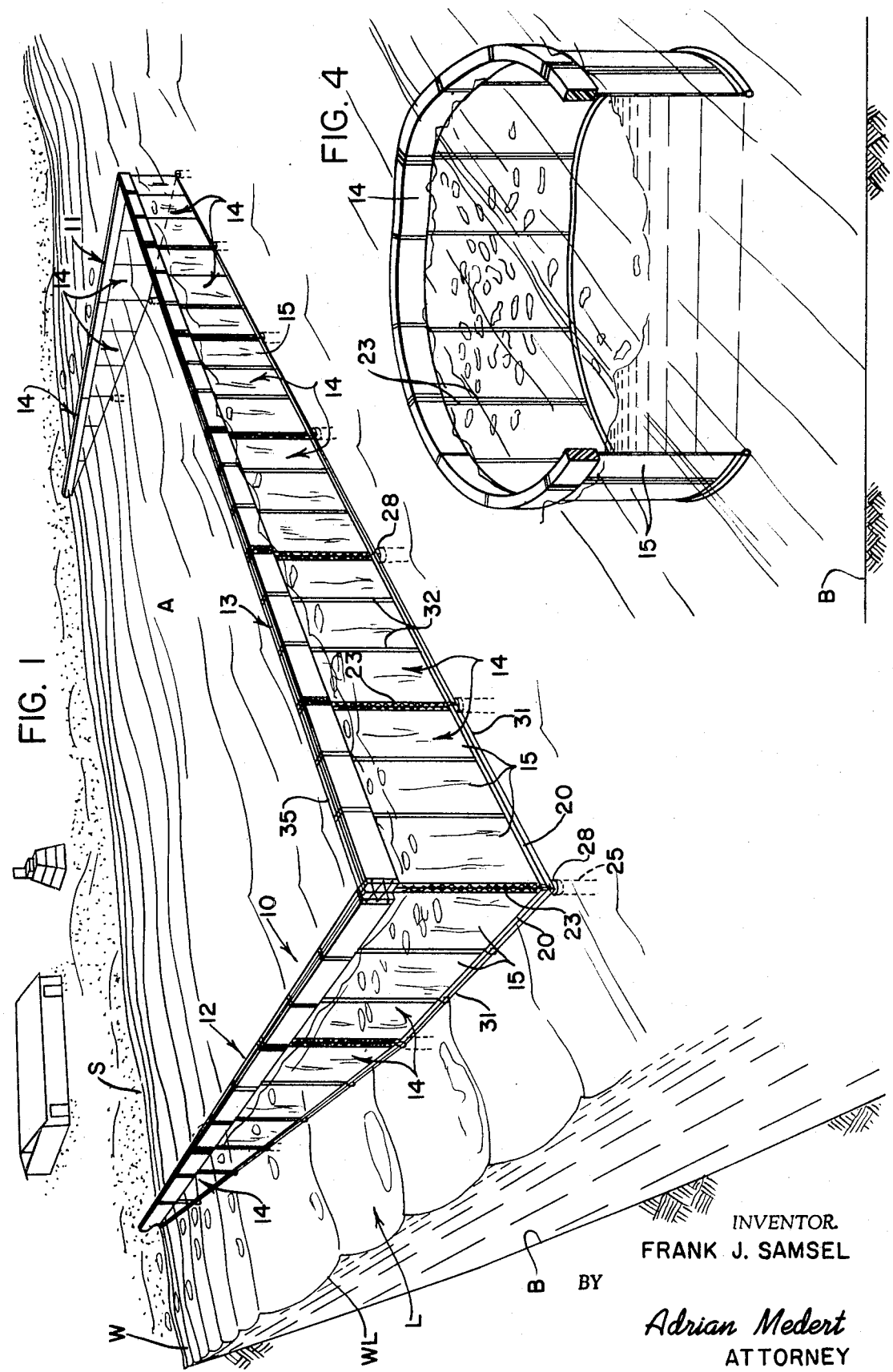

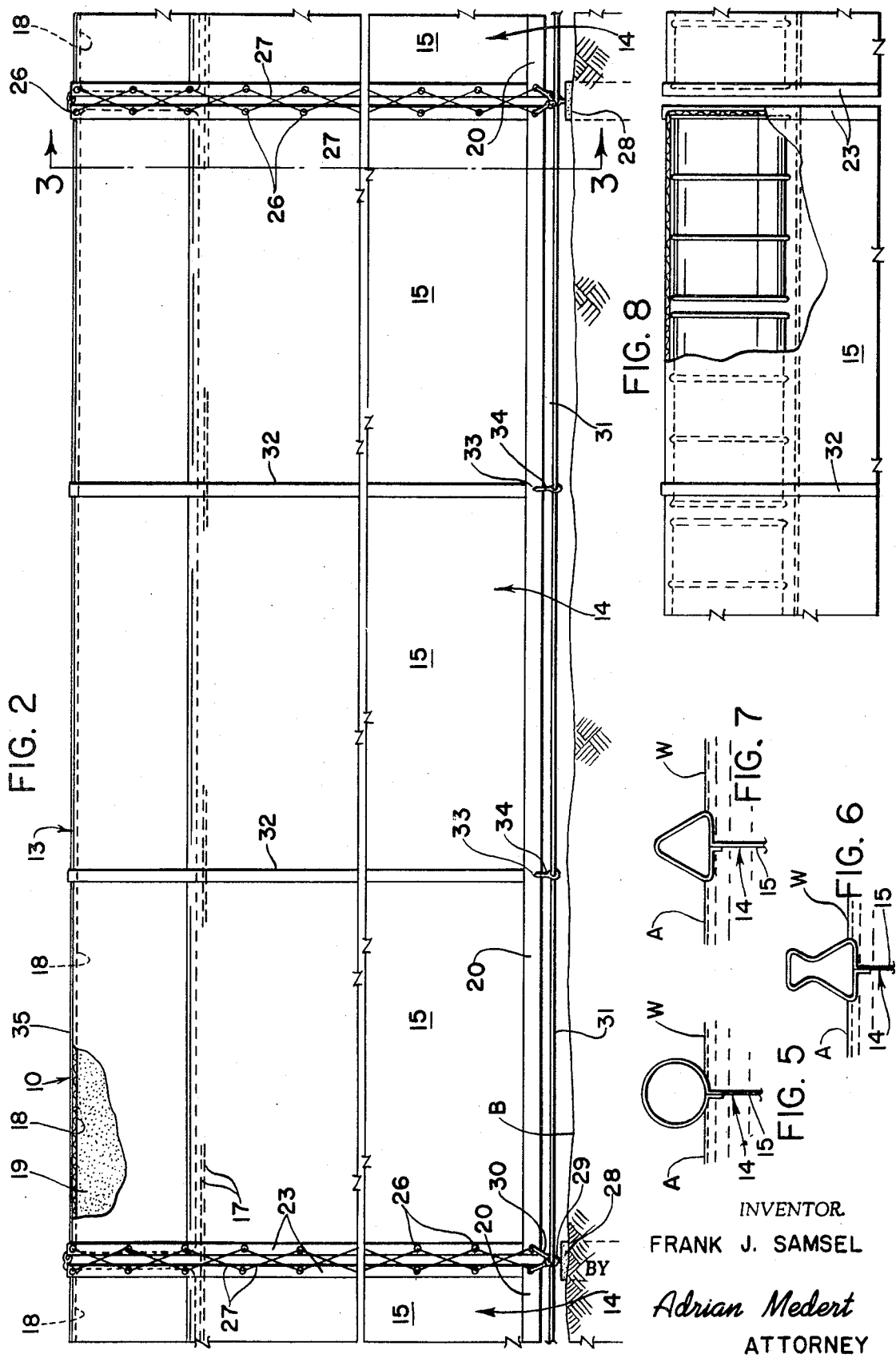

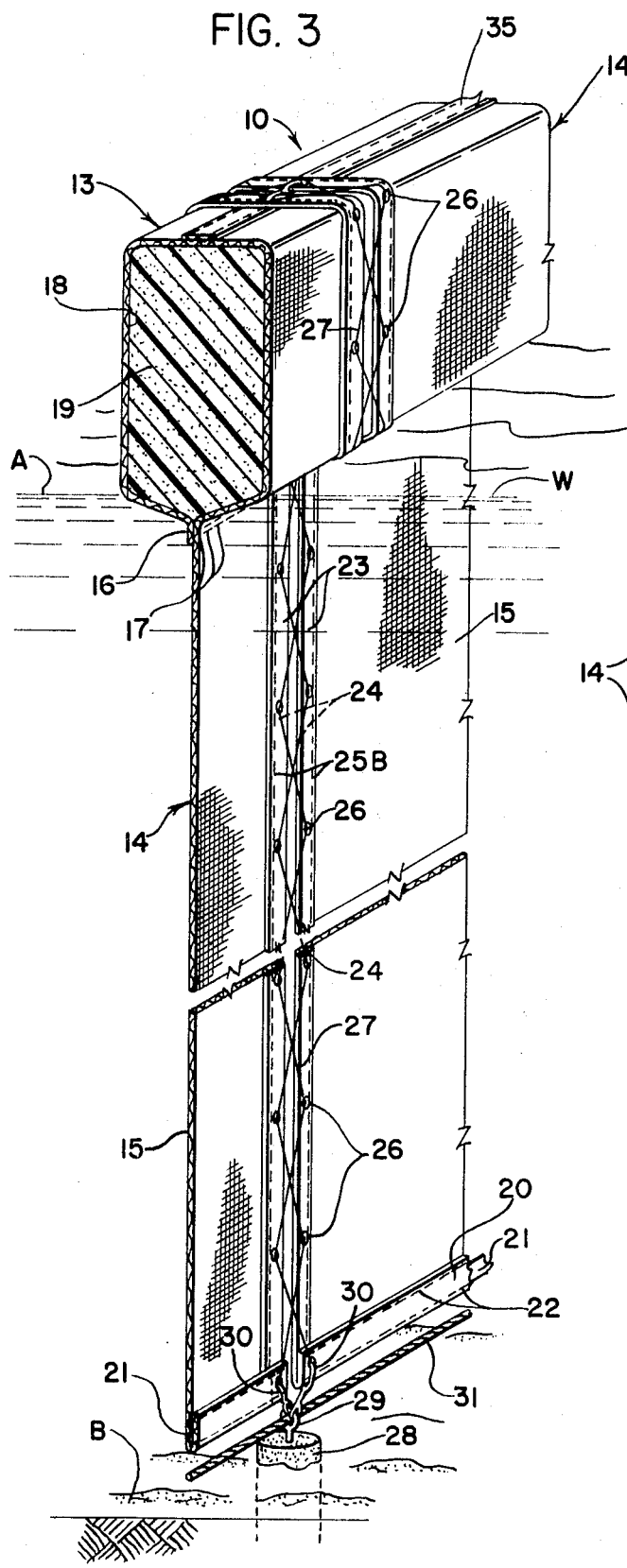
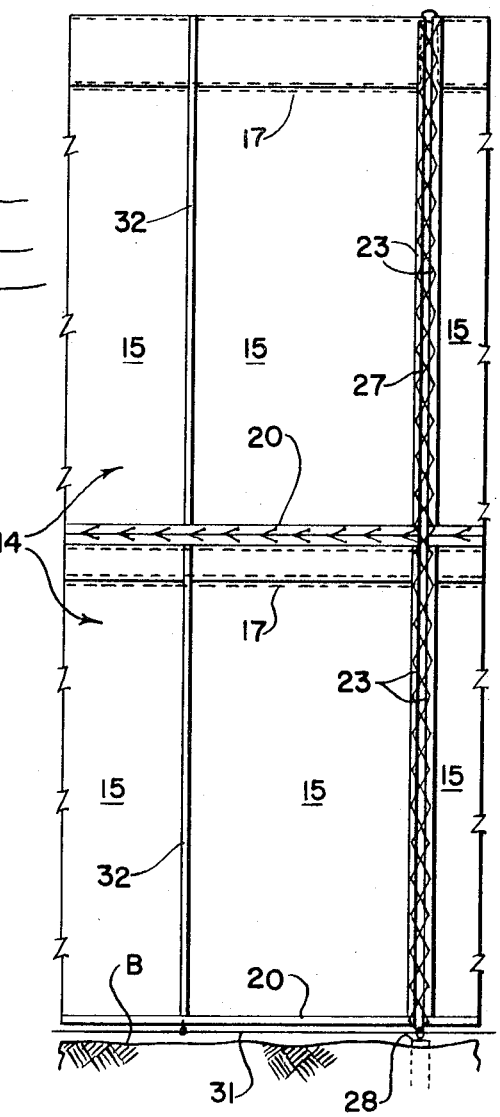
INVENTOR.
FRANK J. SAMSEL
BY Adrian Medert
ATTORNEY

BARRIER FOR DEFINING A SWIMMING AREA

This invention relates to apparatus for defining an area within an open body of water or along the edge thereof and more particularly to a floatable barrier for isolating or segregating such area from the surrounding body of water and treating the water within such area to make it suitable for human occupancy.

It is well recognized that bathing and swimming areas along the edges of lakes and oceans and banks of rivers in the vicinity of large industrial cities are fast disappearing due to the polluted condition of the water, which in most cases is not only undesirable for swimming purposes but is hazardous to the health of swimmers. This condition is accentuated by accidents at sea where a cargo of oil may be discharged in offshore waters resulting in the adjacent beaches becoming unfit for use. In addition, harbor areas surrounding docks where ships are loading or unloading petroleum products or are pumping out oily ballast water or cleaning their tanks with detergents are prone to become oily, polluted and hazardous. Such areas in addition to being unfit for human occupancy are detrimental to marine life, both fish and fowl.

Heretofore, swimming pools have been provided for use in bodies of water to protect swimmers from the hazards and unsanitary condition of contaminated and polluted water. Such prior swimming pools can at best only serve a limited number of people and are relatively expensive due to the complexity of their construction and limitations of use. Such swimming pools at best are a poor substitute for extensive beaches swimming areas capable of accommodating large numbers of swimmers at one time. Accordingly, it has been found not only desirable but necessary to devise means whereby the swimming areas and beaches presently available can be made safe and usable. In this connection, it is also desirable that means be provided to control the introduction of pollutants at the source as in harbor areas or surrounding marine oil well installations so that they may be restricted to confined to isolated areas from which they can be removed and processed.

Accordingly, it is among the objects of the present invention to provide along the edge of an open body of water which may be muddy, polluted, brackish or otherwise unsuitable for swimming or human occupancy an isolated area within which the water may be made sanitary, safe and free of any of the foregoing hazardous conditions.

Another object of the invention is to provide along the edge of an open body of water normally unsuited for human occupancy, an isolated area of such water which may be placed under continuous treatment to make the same suitable for swimming and bathing.

Another object of the present invention is to provide a floatable barrier capable of restricting floating pollutants in a body of water to a designated area from which they may be removed and processed or the barrier may serve to prevent the ingress of pollutants into a designated area within an open body of water.

A still further object of the invention is to provide a sheet-like barrier for isolating an area within an open body of water wherein the upper edge portion of the barrier contains a buoyant material serving to support the said upper portion of the barrier above the surface of the water, the lower edge portion being suitably anchored to maintain the barrier in a substantially vertical position within the body of water.

Another object of the invention is to provide a floatable barrier for use in defining a confined area within a body of water which includes a plurality of sections removably secured together, wherein each section is formed of impervious flexible sheet material having floatable material, which may be either a solid or a gas incorporated in the upper edge portion and anchoring means secured to the lower edge portion and means for securing adjacent sections together.

These and other objects and advantageous features of the present invention will become more apparent from the following detailed description of a preferred embodiment thereof taken in conjunction with the accompanying drawings wherein corresponding reference characters throughout denote corresponding parts and wherein:

FIG. 1 is a perspective view illustrating an isolated area for swimming and bathing purposes formed along the edge of a body of water by employing the barrier of the present invention, FIG. 2 is an enlarged fragmentary elevational view of a portion of the barrier of FIG. 1, illustrating one of the sections thereof, FIG. 3 is an enlarged perspective view of the joint between adjacent sections taken on the line 3—3 of FIG. 2, FIG. 4 is a perspective view illustrating the use of a plurality of barrier sections secured together to define an enclosed area in open water, FIGS. 5, 6, & 7 are schematic sectional views illustrating various cross-sectional forms of floatable material which may be inserted into the top sleeve portion of the barrier, FIG. 8 is a fragmentary side elevational view of the upper portion of the barrier with parts broken away illustrating an alternate means of floating the sections, and FIG. 9 is a fragmentary elevational view of a modified form of barrier suitable for use in deep water.

As hereinbefore noted the barrier of the present invention may be installed adjacent to the edge of a lake or ocean or along the bank of a river to isolate or enclose an area of such body of water or it may be used to entirely surround and enclose a source of pollutants. Although the upper portion of the barrier is uniform in cross section and construction, the height of the individual sections or panel members can be varied as desired in conformity with the depth and the contour of the bottom of the body of water. The barrier effectively serves to preclude the flow of water from the surrounding area into the isolated area and thus floatable material such as wood, oil slicks, pollutants, and the like are restricted to the open water beyond the barrier. It is also contemplated that the water within the isolated area be suitably treated to purify the same. In this regard initial purification is done by introducing substantial amounts of chemicals into the isolated area. Thereafter a continual flow of purified water is introduced into the isolated area so that there will be a tendency for water to move out of the isolated area beyond the barrier thus further enhancing the effectiveness of the barrier to isolate the confined area from the surrounding open water.

With reference to the accompanying drawings and particularly to FIG. 1 there is illustrated the provision of a swimming area along a shore of a lake formed by employing a barrier, generally indicated by the numeral 10, made in accordance with the teachings of the present invention. In this Figure the swimming or isolated area is designated as a whole by the letter A, and the barrier 10 is shown floatably supported by the water W of a lake generally designated L. The bed or bottom of the lake is designated B, and gradually slopes outwardly to greater depth relative to the shore S, the normal waterline being designated WL.

In the illustrated embodiment of the invention the swimming area A is defined by the barrier 10, having end portions 11 and 12 extending outwardly from the shore S the desired distance and a side portion 13, which connects the outer ends of the end portions 11 and 12. The end portions 11 and 12 and side portion 13 of the barrier are constructed of sections or panel members 14 which are suitably secured together to form an integrated structure as will be referred to more particularly hereinafter. The panel members 14 comprising the side portion 13 and a part of each of the end portions 11 and 12 are identical in height as permitted by the depth of the water W. Where the depth of the water decreases gradually to the shoreline S the height of the sections are correspondingly reduced to compensate for the decrease in the distance from the water level to the bottom of the lake.

Structurally all of the panel members or sections 14 are similar except as to heights as above noted so that a detailed description of only one of them will be given, with attention directed particularly to FIGS. 2, 3, and 9. As there illustrated, each section 14 comprises an impervious flexible fabric sheet 15 which is capable resisting the flow of water therethrough. It has been found that a suitable material for forming the sheet 15 is a polyester fabric coated with a polyvinyl chloride which is impervious to fluids and resistant to chemicals used in purifying water and to the usual pollutants found about and in bodies of water. The upper portion of the sheet 15 is reversed and the edge 16 is stitched to the body of the material as at 17 to form a pocket or sleeve 18 coextensive with the upper edge of the sheet. The sheet material being flexible the shape of the sleeve along the upper edge of the section is dependent upon the cross-sectional shape of the floatable material 19 inserted into the pocket or sleeve 18. This material may preferably be a plastic material such as a foamed polyurethane or a foamed polystyrene which has no moisture absorbability and has uniform floatability at all times. Where desirable the sleeve can be constructed so that it is airtight and a gaseous medium can be used in place of the solid material 19.

As shown in FIG. 3 the floatable material 19 within the sleeve 18 is substantially rectangular in cross section. However, other shapes have been found to be suitable such as the cylindrical shape illustrated in FIG. 5, the triangular shape of FIG. 7 or the shape illustrated in cross section of FIG. 6. It is contemplated that other shapes may be found to suitably float the barrier in the desired position and such shapes are deemed within the scope of the invention.

The sheet 15 along the lower edge thereof is overlapped to form a suitable pocket 20 through which a strip of webbing 21 is inserted. The assembled edge is then stitched as at 22 to effect a reinforced lower edge portion to which anchoring means are attached as will be hereinafter pointed out. Similarly, the vertical side edges of the sheet 15 are overlapped to form a pocket 23 through which a strip of webbing 24 is inserted and this assembled edge is stitched as at 25. At spaced points along the reinforced side edges of the sheets eyelets or grommets 26 are provided, which are adapted to receive suitable lacing 27 for securing the side edges of adjacent sections together.

Suitably disposed in the bottom B of the body of water W about the periphery of the swimming area A below the barrier 10 and preferably at points where adjacent sections are secured together are positioned anchoring members. The anchoring members 28 may take any suitable form adequate for securing the lower edge of the barrier in fixed position such as concrete posts or blocks imbedded in the bottom B, or suitable piling can be driven into the bottom B to serve as anchoring members. As shown in FIG. 3 a ring 29 is mounted on the top of the anchoring members 28 and is arranged to receive a connecting link 30 extending from the lowermost corners of the adjacent sections 14 for securing them in position. The several rings 29 also receive a cable 31 which extends between the anchoring members 28 about the perimeter of the swimming area A and serves as a means of anchoring the sections 14 intermediate the spaced anchoring members 28 as is shown in FIG. 2.

At spaced points along the lateral extent of the sheet 15 there are provided strips 32 of reinforcing webbing, extending from the top of the sheet and terminating in the overlapped lower edge portion. At this point a suitable eyelet 33 is provided to receive a connecting link 34 extending to the cable 31. The reinforcing strips of webbing 32 serve to relieve the sheet material 15 from undue strain by reason of anchoring the sheet intermediate the ends thereof.

To compensate for any undue strain or pressure which may be applied to joints between the adjacent sections by reason of disturbances in the water surrounding the barrier or the possible collision of a floating object with the top of the barrier a strip of webbing or reinforcing material 35 (FIG. 3) is secured to the outside uppermost portion of the barrier sections 14. The ends of strips 35 of adjacent sections are secured together so that any load placed on the barrier by a floating object as aforementioned is dissipated along the full length of the barrier.

With reference to FIG. 4, there is shown a modified type barrier for use in defining the area around a petroleum product loading or unloading operation within a harbor area for confining any effluent material discharged from the ship to such area where it can be removed therefrom and treated or processed. The barrier combines as many of the sections 14 that are necessary to define the required area within which the floating material is to be confined. These sections 14 are uniform in height and will employ any suitable anchoring means to fix the barrier in operative position with respect to the operation undertaken. Instead of a permanent securing means of the type shown in FIG. 3 the lower edge of the barrier may be provided with any suitable weight which will serve to maintain the sheet 15 of the individual sections in a substantial vertical position.

The barrier disclosed in FIG. 4 is capable of enclosing areas of open water to confine oil deposited on the surface of the water by reason of a collision or sea accident or offshore drilling for oil results in the seepage of oil, which finds its way to the surface of the water.

While I have described the above embodiment of my invention in some detail, it will be apparent to those skilled in the art that various modifications and changes may be made without departing from the spirit of my invention as hereinafter claimed.

I claim:

1. A barrier for isolating an area within a body of water so that the water in such area may be treated to the exclusion of the remainder of the body of water including a plurality of sections removable secured together to form an integrated structure, said sections each comprising a flexible sheet of impervious material disposed in a substantially vertical position when disposed within the body of water, the upper edge portion of said sheet defining a transverse chamber, floatable material filling said chamber, said sheet extending from a position adjacent the bottom of the area isolated to a point above the surface of the surrounding body of water commensurate with the height of the floatable material above the surface of the water, and means disposed along the lower edge portion of the barrier for securing the sheets to the bottom surface of the isolated area when the same is disposed therein:

2. A structure as defined in claim 1 wherein the vertical edge portions of adjacent sections are provided with means for securing the panel members together.

3. A structure as defined in claim 1 wherein said last named means includes a reinforcing edge portion on the flexible sheet, an anchoring member on the bottom of the body of water and links extending between the lower edge portion of the sheet and the said anchoring member.

4. A structure as defined in claim 2 wherein the means for securing adjacent sections together includes eyelets formed along the vertical edge portions of the sheets and lacing adapted to be received by the said eyelets.

5. A structure as defined in claim 1 wherein the floatable material is characterized by being cellular in construction, having no moisture absorbability and uniform floatability.

6. A structure as defined in claim 1 wherein means are provided for treating the water within the isolated area.

* * * * *